Feb. 5, 1974 J. L. HUTCHESON Re. 27,913

EASY OPEN POUCH CONSTRUCTION

Original Filed Feb. 16, 1970

INVENTOR
JAMES L. HUTCHESON

BY Glenn, Palmer, Lyne, Gibbs & Thompson

ATTORNEYS

United States Patent Office

Re. 27,913
Reissued Feb. 5, 1974

27,913

EASY OPEN POUCH CONSTRUCTION

James L. Hutcheson, Mechanicsville, Va., assignor to Reynolds Metals Company, Richmond, Va.

Original No. 3,650,461, dated Mar. 21, 1972, Ser. No. 11,459, Feb. 16, 1970. Application for reissue June 23, 1972, Ser. No. 265,737
Int. Cl. B65d *5/54, 31/02*
U.S. Cl. 229—66 3 Claims

Matter enclosed in heavy brackets [ ] appears in the original patent but forms no part of this reissue specification; matter printed in italics indicates the additions made by reissue.

ABSTRACT OF THE DISCLOSURE

An easy open pouch construction and a method of and apparatus for making same. Flexible packaging material is formed into a strip of pouches joined along their longitudinal side seams and fed intermittently through guide means adjacent a reciprocable hole puncher. The feeding means includes means such as an electric eye assembly for detecting the mid-point of the longitudinal side seam between adjacent pouches whereby the reciprocable hole puncher is actuated to punch a hole spaced a slight distance from the mid-point of the longitudinal seam. The strip of pouches is then cut to form an individual pouch which is filled conventionally. The resultant pouch is found to have improved easy opening characteristics.

It has been customary to provide pouches with easy opening devices, usually in the form of a V-shaped notch, which removes a portion of the marginal edge of the pouch. One undesirable feature of pouches formed in this manner is that the seam structure is weakened unduly in that the resistance to propagation of the tear from a notch is low. Similar disadvantages accrue to pouches employing cuts, slits or tear tabs as opening devices.

In accordance with the present invention, a heat sealed pouch made from resilient material is provided with an easy opening device which will resist tear propagation. The pouches are formed from a continuous web of resilient material and are provided with longitudinal side seams while the pouches are still united in strip form. The continuous strip of pouches is fed substantially normal to the path of reciprocation of a hole punching device and through guide means mounted immediately thereadjacent. The guide means is defined by a transversely apertured, downwardly extending, parallel pair of legs in a housing member which also supports an air cylinder used to drive a reciprocable hole punching member. The punch is preferably a pinhole punch and in actuated intermittently in synchronism with the intermittent feed of the strip-formed pouches.

While the continuous strip of pouches are being advanced intermittently, a web control unit, such as an electric eye assembly, senses the midpoint of the side seam between a pair of individual pouches whereby the air cylinder is actuated to punch a hole in the side seam a short distance from the midpoint of the seam. It is within the scope of the invention to utilize two pinhole punches which may be actuated simultaneously to place one hole in each side seam of each pouch so that any pouch may be opened from either side. After the pinhole is placed in the side seams of the pouches, the continuous strip thereof is guided to a cutter means where the pouches are separated to form individual complete pouches. The pouches may be filled conventionally either before or after being severed from the strip.

The inherent advantages and improvements of the present invention will become more readily apparent upon considering the following detailed description of the invention and by reference to the drawings in which.

Figure 1:
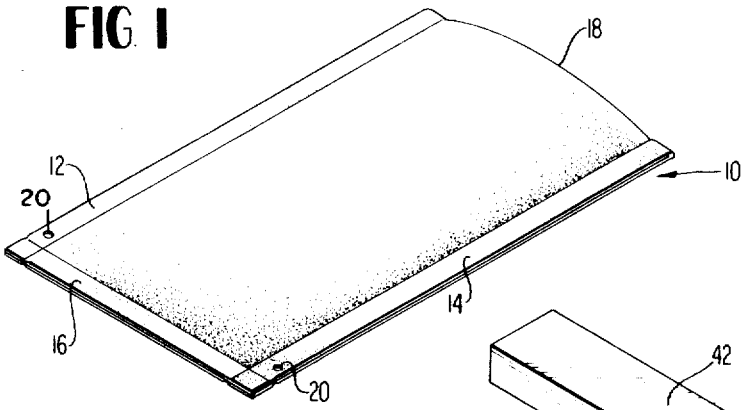
FIG. 1 is a perspective view of a pouch produced by one embodiment of this invention.

Referring now to FIG. 1 of the drawings, there is illustrated a pouch, indicated generally at 10, which is provided with opposed longitudinal side seams 12 and 14. A top seam is shown at 16 and a bottom fold at 18. While it is preferred to fold a web of material in half to provide a folded bottom 18, it is within the scope of this invention to make a pouch which is fin-sealed on all four sides, i.e., one which is made either from a pair of sheets or from two webs of material. Numeral 20 represents a circular perforation or hole in each of the longitudinal side seams 12 and 14 which is spaced slightly below the sealed top seam 16. A pouch may have a circular perforation or hole 20 in either one or both of the side seams.

Figure 3:
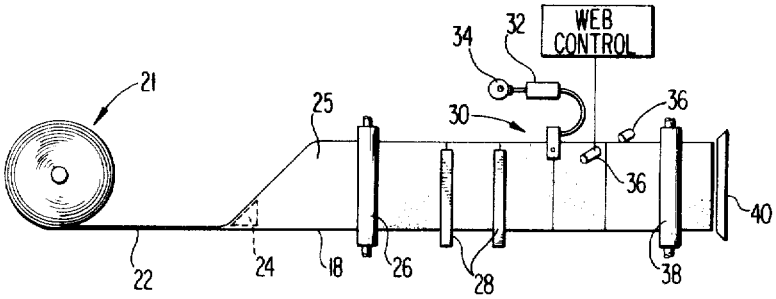
FIG. 3 is a schematic elevational view illustrating the process of forming the pouches of this invention; and, FIG. 4 is a fragmentary elevational view of a plurality of pouches, united in strip form, produced by another embodiment of this invention.

Referring now to FIG. 3, there is illustrated one method by which the pouch construction of the present invention may be formed on a continuous basis. Thus there is illustrated a roll of flexible material 21 which for purposes of this invention may comprise any suitable pouch material and may comprise a laminated construction such as one having an aluminum foil exterior and a heat sealable plastic interior material. Wherever nonfood products are not involved, polyethylene may be used for the interior material. However, since polyethylene is inclined to impart a flavor to a food product, it is preferable to use some other material for such applications such as Nylon 11, for example. Other laminated materials may be used without departing from the spirit and scope of this invention.

The pouch material is fed from roll 21 as a web or strip of material indicated at 22 and folded centrally thereof by means of a plough member 24 to provide a folded sheet 25 with folded bottom 18. The strip of folded sheet material 25 is advanced such as by a feed roller 26. One or more side seam bars 28 are used to provide the longitudinal side seams 12 and 14 within approximately three quarters of an inch from the top of the folded sheet 25. Numeral 30 designates generally the punching means which are used to impart at least one circular hole 20 in each pouch in the strip. An air supply chamber is schematically designated at 32 and numeral 34 indicates a cam means for controlling the supply of air to an air cylinder to be described hereinafter.

Figure 2:
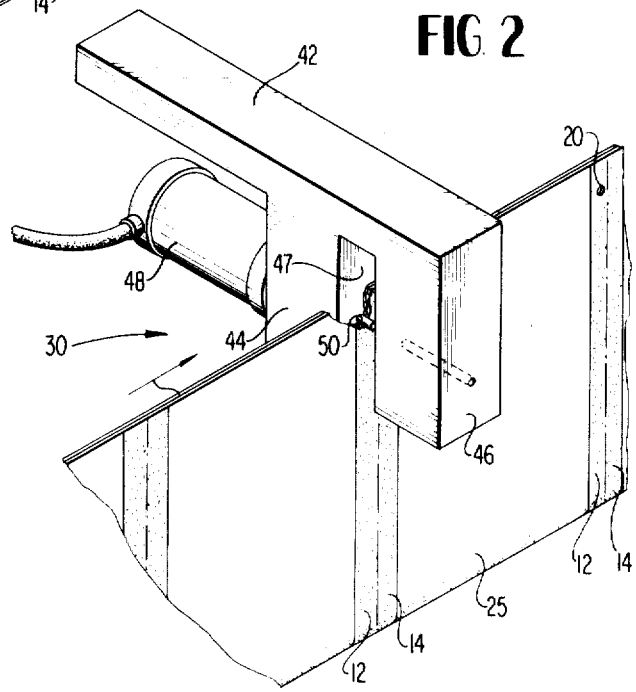
FIG. 2 is a fragmentary perspective view of the punching apparatus in position to perforate a longitudinal side seam of strip pouches.
Figure 4:
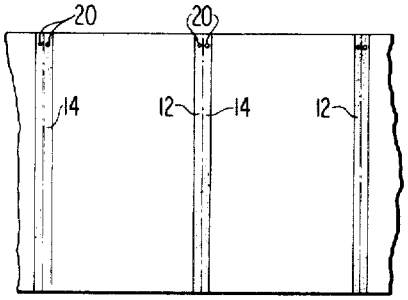

Coordinated with the cam means 34 is an electric eye assembly the components of which are indicated at 36 in FIG. 3. The electric eye assembly 36 relies upon conventional means such as printed indicia, not shown, on the web material in order to sense the midpoint of each longitudinal side seam which lies along centerlines such as are shown in FIGS. 2 and 4. It thus becomes possible to control the feedback from the electric eye assembly 36 to the intermittent feed for the strip material 22 to ensure that the pin holes 20 are spaced a slight distance from the midpoint of the longitudinal seams as is shown in FIGS. 1, 2 and 4. This slight distance may be in the order of one sixty-fourth of an inch, for example. The strip of folded sheet 25 is further advanced by means of feed roller 38 to a cutoff means 40. The individual pouches may be filled either prior to or subsequent to the actuation of cutoff means 40. For the purposes of this invention, the means for filling the pouches is conventional.

Referring now to FIG. 2, there is indicated a housing member 42 which is provided with laterally spaced, downwardly extending, parallel legs 44 and 46. The spacing between legs 44 and 46 defines a slot 47 which provides guiding means into which the intermittently advanced strip of folded sheet 25 is fed. A suitable means, such as an air cylinder 48, is supported by legs 44 of housing member 42 and a circular punch 50 is driven thereby across the slot 47 in order to provide a circular hole or perforation 20 in the longitudinal steam of each pouch spaced inwardly from the edge thereof. Legs 44 and 46 are provided with suitable holes to receive and guide the punch 50 in its forward and reverse strokes.

In a modified form of this invention, the air cylinder 48 may be provided with two pinhole punches in order to puncture each longitudinal seam in two places on either side of the midpoint between the longitudinal seam as is shown in FIG. 4. In this form of the invention, each longitudinal side seam 12 and 14 is provided with a circular hole 20 spaced slightly inwardly from the edge of the pouch, such as one sixty-fouth of an inch, whereby the individual pouch may be opened by means of a twisting action from either side of the pouch. It is convenient in both embodiments to print instructions such as "open here" on the pouch adjacent each puncture.

Because the pouches have circular holes in the form of pinholes in the longitudinal side seams, the seams are not weakened such as they are when V-notches, cuts, slits or tear tabs are employed. In addition, the tear propagation is considerably higher for a circular hole than for notches, slits, cuts, or tear tabs, whereby an improved pouch is provided.

While presently preferred embodiments of the invention have been illustrated and described, it will be recognized that the invention may be otherwise variously embodied and practiced within the scope of the claims which follow.

What is claimed is:

1. A flexible pouch construction formed from a laminated material having a heat sealable plastic inner layer [and a metallic foil outer layer], said construction comprising:

(a) a pair of opposed and relatively narrow longitudinal side seams, (b) a sealed top seam, (c) at least one of said longitudinal side seams having a circular perforation therein which resists tear-propagation in said laminated [plastic foil] pouch construction, said circular perforation being slightly below and spaced from said sealed top seam and entirely within the area of said longitudinal side seam whereby said pouch construction may be easily opened by a twisting action at said circular perforation.

2. A flexible pouch construction as defined in claim 1, wherein each longitudinal side seam is provided with a circular perforation therein slightly below said sealed top seam.

*3. A flexible pouch construction as defined in claim 1 wherein said laminated material includes a metallic foil layer laminated exteriorly of said plastic inner layer.*

References Cited

The following references, cited by the Examiner, are of record in the patented file of this patent or the original patent.

UNITED STATES PATENTS

| | | | |
|---|---|---|---|
| 564,247 | 7/1896 | Hirsch | 229—81 |
| 1,157,568 | 10/1915 | Mills | 229—66 |
| 2,248,266 | 7/1941 | Abrams | 229—66 UX |
| 2,333,587 | 11/1943 | Salfisberg | 229—51 R |
| 2,952,399 | 9/1960 | Searle | 229—66 |
| 3,061,169 | 10/1962 | Yermakoff et al. | 229—51 R |
| 3,343,664 | 9/1967 | E. J. Poitras | 229—66 |
| 3,390,507 | 7/1968 | Repko | 229—66 |
| 3,625,351 | 7/1971 | Eisenberg | 229—66 |

SAMUEL ROTHBERG, Primary Examiner

S. MARCUS, Assistant Examiner

U.S. Cl. X.R.

229—51 R, 51 TS, 85